(12) United States Patent
Schmitz et al.

(10) Patent No.: US 7,663,582 B2
(45) Date of Patent: Feb. 16, 2010

(54) DISORDERED PERCOLATION LAYER FOR FORMING CONDUCTIVE ISLANDS ON ELECTRIC PAPER

(75) Inventors: Gregory P. Schmitz, Los Gatos, CA (US); Michael B. Heaney, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 638 days.

(21) Appl. No.: 10/739,809

(22) Filed: Dec. 18, 2003

(65) Prior Publication Data

US 2005/0134552 A1    Jun. 23, 2005

(51) Int. Cl.
  *G09G 3/34* (2006.01)
  *G09G 3/36* (2006.01)
  *G02B 26/00* (2006.01)

(52) U.S. Cl. .......................... 345/84; 345/86; 345/107; 359/296

(58) Field of Classification Search ........... 345/84–111; 359/48, 84–86, 105, 107–109, 296
See application file for complete search history.

(56) References Cited

U.S. PATENT DOCUMENTS

| | | | |
|---|---|---|---|
| 4,126,854 A | 11/1978 | Sheridon | |
| 5,334,330 A * | 8/1994 | Rowlette | .................... 252/512 |
| 5,389,945 A | 2/1995 | Sheridon | |
| 5,723,204 A | 3/1998 | Stefik | |
| 6,222,513 B1 | 4/2001 | Howard et al. | |
| 6,235,395 B1 | 5/2001 | Sacripante et al. | |
| 6,265,466 B1 | 7/2001 | Glatkowski et al. | |
| 7,139,114 B2 * | 11/2006 | Schmitz et al. | ............. 359/296 |
| 2002/0099114 A1 | 7/2002 | Nakayoshi et al. | |
| 2002/0102385 A1 | 8/2002 | Kuhl et al. | |
| 2006/0046036 A1 | 3/2006 | Heaney et al. | |

OTHER PUBLICATIONS

Michael B. Heaney, Measurement And Interpretation Of Nonuniversal Critical Exponents In Disordered Conductor-Insulator Composites, The American Physical Society, Physical Review B, Nov. 1, 1995, pp. 12477-12480, vol. 52, No. 17.
Paul J. Glatkowski, "Carbon Nanotube Based Transparent Conductive Coatings," Eikos Inc., www.eikos.com, (updated at least as of Jun. 2, 2003).
Micheal B. Heaney, "Imaging and Electrical Resistivity Measurements of Disordered Carbon-Black-Polymer Composites," American Chemical Society, pp. 8-29 (1999).

* cited by examiner

*Primary Examiner*—Srilakshmi K Kumar
(74) *Attorney, Agent, or Firm*—Fay Sharpe LLP

(57) ABSTRACT

An exemplary embodiment for an electric paper application is provided. The embodiment utilizes a disordered percolation layer for forming conductive islands on electric paper. The percolation layer is comprised of a disordered mixture of conductive and non-conductive particles that are attached to a non-conductive surface to provide conductive islands therein so that the electric charge can be appropriately held near the media plane of the electric paper.

20 Claims, 5 Drawing Sheets

DISORDERED PERCOLATION LAYER FOR FORMING CONDUCTIVE ISLANDS ON ELECTRIC PAPER

BACKGROUND

The present exemplary embodiment relates to the use of electronic display materials for electric paper applications. It finds particular application in rendering electric paper applications more flexible and more cost effective by providing charge-retaining islands through a disordered percolation layer, and will be described with particular reference thereto. However, it is to be appreciated that the present exemplary embodiment is also amenable to other like applications.

By way of background, electric paper can be defined as any electronically-addressable display medium that approximates paper in form and function. To be most versatile, electric paper should be light-weight, thin and flexible, and it should display images indefinitely while consuming little or no power. In addition, electric paper should be reusable. One must be able to erase images and create new ones repeatedly. Preferably, electric paper should display images using reflected light and allow a very wide viewing angle.

One way to make electric paper possible using traditional electronic display technology is to completely remove the driving electronics from an electronic display package and use external addressing electrodes to write and erase images. This approach both reduces the per unit cost of electronic paper sheets and enables the use of cheap, flexible plastic films in place of glass plates for packaging. Multiple electronic paper sheets can then be addressed by a single set of external driving electronics, much like multiple sheets of pulp paper are printed on by a single printer.

A known sheet and display system, dubbed Gyricon, is disclosed in various patents and articles, such as U.S. Pat. No. 4,126,854 by Sheridon titled "Twisting Ball Display." The Gyricon display system is comprised of an elastomeric host layer of approximately 300 micrometers thick which is heavily loaded with rotating elements, possibly spheres, tens of micrometers (e.g., 100 micrometers) in diameter that serve as display elements. Each rotating display element has halves of contrasting colors, such as a white half and a black half. Each bichromal rotating element also possesses an electric dipole, nominally orthogonal to the plane that divides the two colored halves. Each bichromal rotating element is contained in its own cavity filled with a dielectric liquid. Upon application of an electric field between electrodes located on opposite surfaces of the host layer, the rotating elements will rotate depending on the polarity of the field, presenting one or the other colored half to an observer.

A Gyricon sheet has many of the requisite characteristics of electric paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media and Addressing Device Therefor," describes an electric paper printing system that employs independent, external addressing means to put images on the Gyricon sheets. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the magnitude and polarity of the electric fields.

FIG. 1 shows a representation of a Gyricon sheet comprised of a plurality of bichromal rotating elements, or display elements, cast in a retaining medium, or media plane, 200. It is contained between a first encapsulating layer, or image plane, 202 and a second encapsulating layer 204. The sheet 200 and encapsulating layers 202, 204 are placed in proximity to a supporting back plane 206 that is electrically grounded. The layer 204 and plane 206 comprise a ground plane. An external addressing device 208 connected to a power supply 210 is depicted moving across the sheet in a direction D. Each bichromal sphere, or display element, 220, 226, 232 is contained in its own liquid-filled cavity 221, 227, 233 within the retaining medium 200. An electric field exists directly between the external addressing device 208 and the equipotential surface 206 that causes the local bichromal sphere 226 to rotate.

To improve performance, more recent embodiments of these sheets advantageously incorporate charge-retaining islands thereon. U.S. Pat. No. 6,222,513 B1, issued Apr. 24, 2001 and entitled "Charge Islands for Electric Paper and Applications Thereof" describes electric paper having these features. Turning now to FIG. 2, an exemplary Gyricon sheet of this type is shown. The gyricon sheet is comprised of the following elements: a sheet 300, a first encapsulating layer 302 patterned with conductive charge-retaining islands 306, and a second encapsulating layer 304 that may or may not be patterned with charge-retaining islands.

Together, the first encapsulating layer 302 and the second encapsulating layer 304 do the following things: indefinitely contain a sheet 300, provide at least one transparent window through which the sheet 300 can be viewed, and provide at least one external surface patterned with charge retaining islands 304 that can be addressed with an external charge transfer device. The first encapsulating layer 302 and second encapsulating layer 304 could take the form of thin plastic sheets that are sealed or fastened around the perimeter of the sheet 300. The second encapsulating layer 304 need not be entirely separate from the first encapsulating layer 302. The second encapsulating layer 304 could simply be an extension of the first encapsulating layer 302, folded over and around the edge of the sheet and then sealed or fastened around the remaining perimeter. The first encapsulating layer 302 and second encapsulating layer 304 could also take the form of a coating, applied by spraying, doctoring, or some other method to hold the contents of the sheet 300.

FIG. 2 also shows a pattern for the charge retaining islands 306 of the outer surface of the first encapsulating layer 302. Charge-retaining islands 306 have square perimeters and are organized in a regular two-dimensional array. Narrow channels 303 of insulating material separate the charge-retaining islands 306. The channels 303 serve to isolate the charge-retaining islands 306, preventing migration of charge laterally across the encapsulating sheet, and should be small with respect to the charge-retaining islands 306, so that the maximum possible area of the display is covered with conductive charge-retaining material.

FIG. 3 simply illustrates a second possible embodiment of a charge-retaining island pattern that utilizes a random array of islands. The top view of the first encapsulating layer 400 shows randomly shaped and oriented charge retaining islands 404 separated by channels 402. Charge retaining islands 404 must still be relatively large compared to the channels 402, but in such a random distribution, both feature sizes must be much smaller than the pixel size of a displayed image.

The charge retaining islands can be created on or in an encapsulating layer by many means with any conductive material. One technique, which has been tested, creates islands of conductive and transparent Indium Tin Oxide (ITO) on a transparent polyester film. The polyester is coated with a very thin layer of ITO, and then channels are etched in the ITO by photolithographic processes well known in the art. The remaining conductive ITO regions act as charge retaining islands, while insulating channels are created by the underlying polyester. Another technique, called Flexography, has also been used to form these island structures on electric paper configurations.

However, the use of conductive islands, while a good solution to many problems involving electric paper, presents other difficulties. First, producing the conductive islands by the technique above and other techniques can be difficult and costly. Second, because the conductive islands are typically disposed in a regular pattern, undesired Moiré patterns are developed in the image. Therefore, an alternative technique for providing conductivity to the surface of electric paper structure is desired.

The present application resolves these difficulties and others.

BRIEF DESCRIPTION

In accordance with one aspect of the present exemplary embodiment, the apparatus comprises a ground plane, a media plane having a first side adjacent the ground plane, the media plane having embedded therein display elements that are reactive to electrical fields, an image plane having a first side adjacent a second side of the media plane, the image plane being formed of a clear plastic material, and a charge retention layer adjacent a second side of the image plane, the charge retention layer operative to hold electrical charge near the display elements of the media plane and including a disordered mixture of conductive particles and non-conductive particles, a ratio of the conductive particles to the non-conductive particles being below a percolation threshold.

In accordance with another aspect of the present exemplary embodiment, the display elements comprise microencapsulated bichromal spheres.

In accordance with another aspect of the present exemplary embodiment, the plastic material is a clear, flexible plastic material.

In accordance with another aspect of the present exemplary embodiment, the ground plane, the media plane, the image plane and the charge retention layer are selectively adhered to adjacent layers.

In accordance with another aspect of the present exemplary embodiment, the disordered mixture is encapsulated in an elastomeric material.

In accordance with another aspect of the present exemplary embodiment, the apparatus comprises a ground plane, a media plane having a first side adjacent the ground plane, the media plane having embedded therein display elements that are reactive to electrical fields, a charge retention layer adjacent a second side of the media plane, the charge retention layer operative to hold electric charge near the display elements of the media plane and including a disordered mixture of conductive particles and non-conductive particles, a ratio of the conductive particles to the non-conductive particles being below a percolation threshold.

In accordance with another aspect of the present exemplary embodiment, the display elements comprise microencapsulated bichromal spheres.

In accordance with another aspect of the present exemplary embodiment, the ground plane, media plane and charge retention layer are selectively adhered to adjacent layers.

In accordance with another aspect of the present exemplary embodiment, the disordered mixture is encapsulated in an elastomeric material.

In accordance with another aspect of the present exemplary embodiment, the apparatus comprises a media plane, the media plane having embedded therein display elements that are reactive to electric fields, and a charge retention layer, the charge retention layer operative to selectively hold electric charge near the display elements of the media plane and including a disordered mixture of conductive particles and non-conductive particles, a ratio of the conductive particles to the non-conductive particles being below a percolation threshold.

In accordance with another aspect of the present exemplary embodiment, the apparatus further comprises a ground plane.

In accordance with another aspect of the present exemplary embodiment, the apparatus further comprises an image plane.

In accordance with another aspect of the present exemplary embodiment, the plastic material of the image plane is clear, flexible plastic material.

In accordance with another aspect of the present exemplary embodiment, the display elements comprise an electrophoretic display.

In accordance with another aspect of the present exemplary embodiment, the media plane and charge retention layer are adhered to one another.

In accordance with another aspect of the present exemplary embodiment, the disordered mixture is encapsulated in an elastomeric material.

In accordance with another aspect of the present exemplary embodiment, a method comprises determining a ratio of conductive particles to non-conductive particles that is below a percolation threshold, mixing conductive particles and non-conductive particles according to the ratio to obtain a disordered mixture of particles, and applying the disordered mixture of particles to the media plane to selectively hold electric charge near the display elements of the media plane.

In accordance with another aspect of the present exemplary embodiment, the disordered mixture is applied to an image plane.

In accordance with another aspect of the present exemplary embodiment, the image plane is plastic material.

In accordance with another aspect of the present exemplary embodiment, the disordered mixture is applied directly to the media plane.

DETAILED DESCRIPTION

Figure 1:
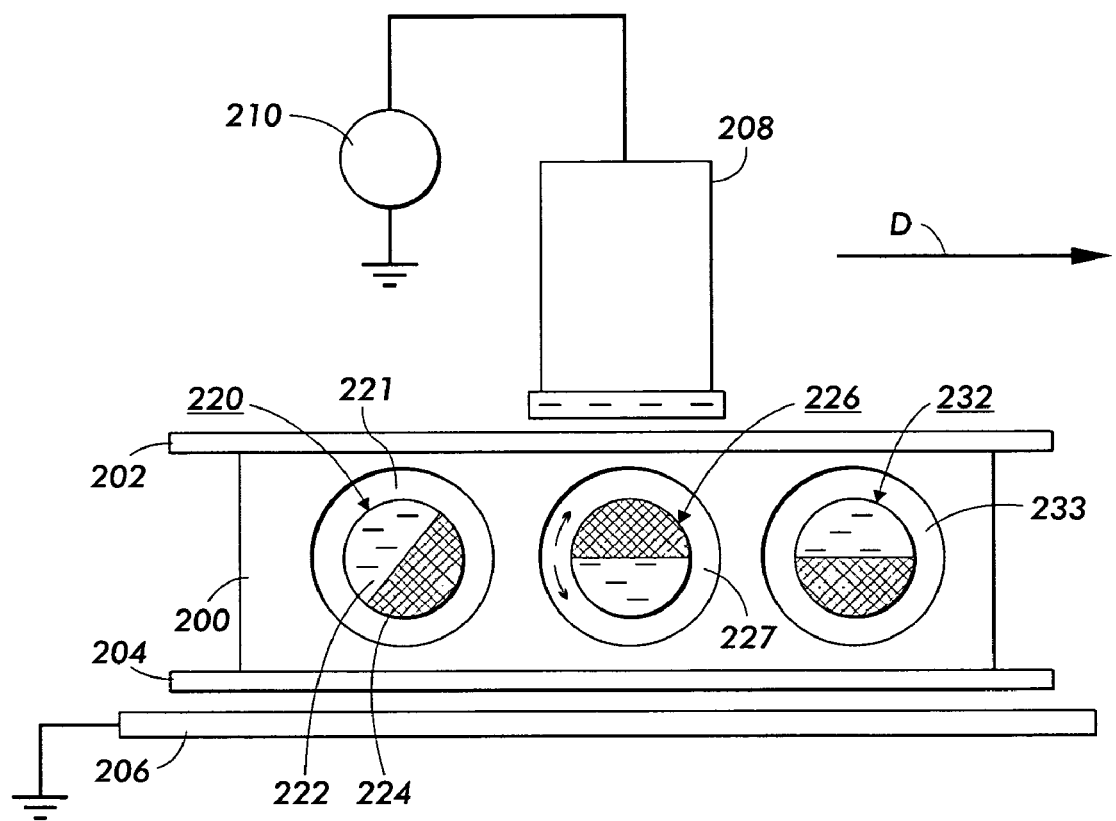
FIG. 1 is a cross-sectional view of a portion of a prior art electric paper configuration.
Figure 2:
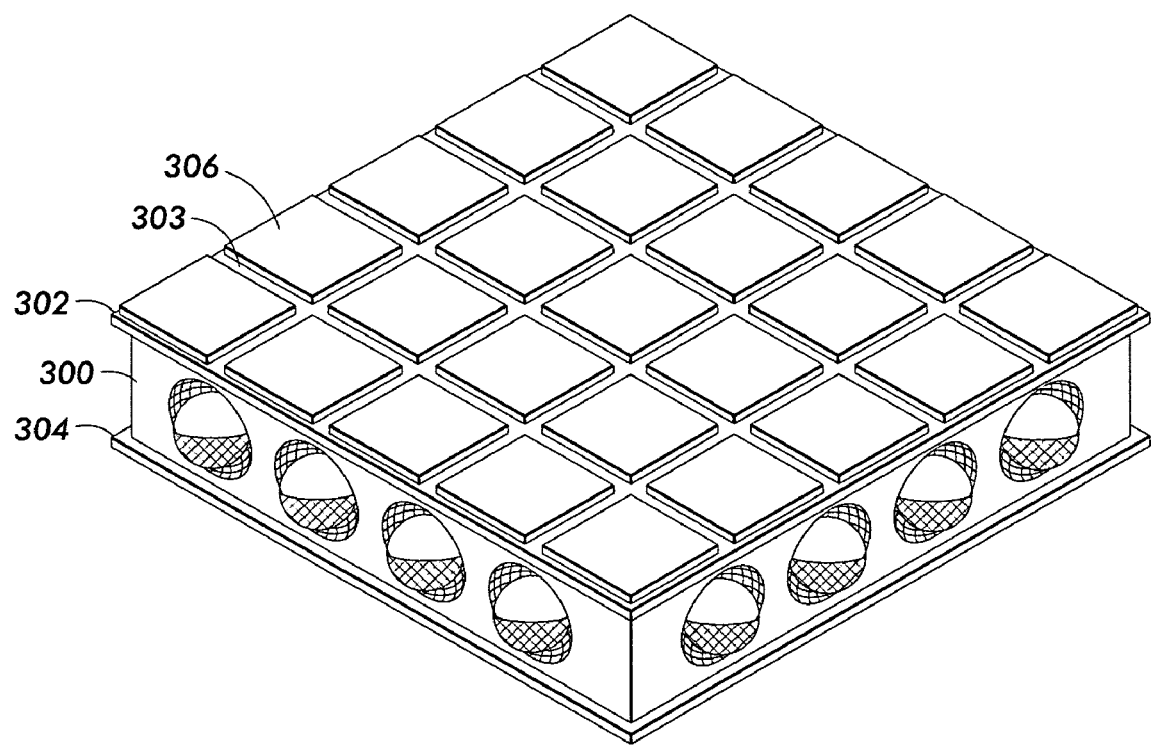
FIG. 2 is a perspective view of a prior art electric paper configuration.
Figure 3:
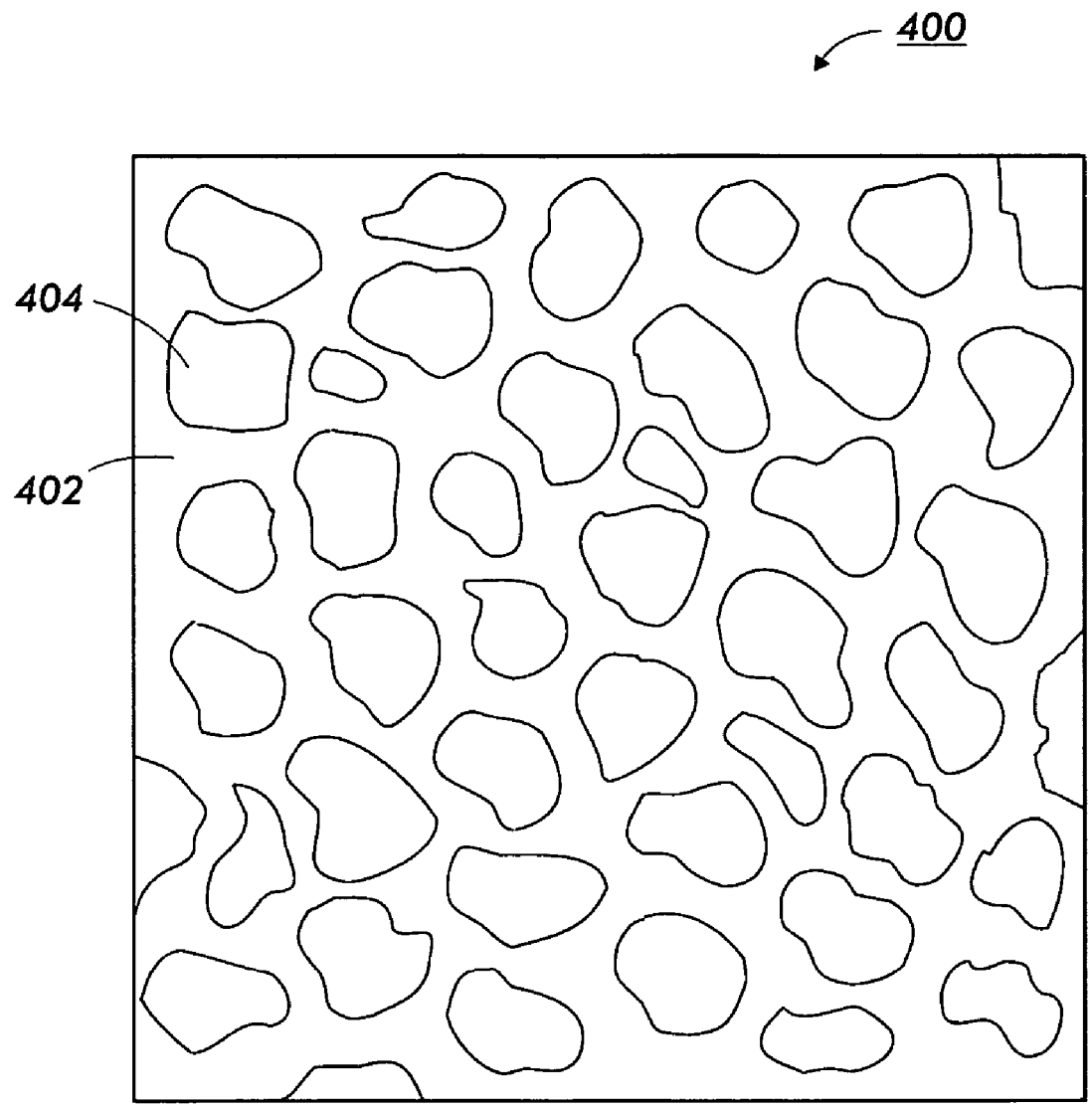
FIG. 3 is a top view of a prior art electric paper configuration.

Presently described embodiments of an electric paper application advantageously include a charge retention layer formed from a disordered mixture of conductive and non-conductive particles. In one form to be described in greater detail below, the disordered mixture is attached to a non-conductive surface. For example, randomly mixed and pre-measured amounts of 10 micrometer glass spheres (e.g. non-conducting particles) with 10 micrometer silver-coated glass spheres (e.g. conducting particles) are sprinkled onto a flexible plastic film. The film is coated with adhesive to retain the particles. This film is then joined to the rest of the electric paper structure as an image plane, or encapsulating layer. If the relative fractions of conductive and non-conductive particles within the disordered mixture are below a percolation threshold (which can be calculated and measured), then randomly located and shaped conductive islands (comprised of one or more of the silver-coated glass spheres) will be formed. This structure of adhered particles, referenced to herein as a charge retention layer, will replace conductive island layers formed using photolithographic patterning of ITO films deposited on flexible plastic sheets and other techniques.

This embodiment overcomes the previously described difficulty of the prior embodiments of electric paper inasmuch as the positioning of the conductive particles, or islands, is random in nature. This inherently eliminates Moire effects. Moreover, the average size of the conductive islands (referred to as the correlation length) can be controlled by changing the relative fractions of conductive and non-conductive particles. Moreover, the process of mixing and sprinkling is significantly less expensive and more efficient than photolithographic patterning processes that are known to exist.

In another embodiment to be described, the randomly premixed amounts of conductive and non-conductive particles are sprinkled directly onto a smooth and sticky layer of the media plane of electric paper. This embodiment provides the advantages noted above as well as the additional advantage that any voltage applied to a conductive island will substantially appear at the surface of the media plane with negligible voltage drop.

The determination of the ratio of conductive to non-conductive particles is accomplished to obtain a value that is below a percolation threshold for the particles as applied to the electric paper. It should be understood that the value desired is a value below the percolation threshold because the mixture of conductive and non-conductive particles will merely contain random conductive islands if the ratio is indeed below the percolation threshold. If the ratio is above the percolation threshold, a continuous conductive path will be formed, which is not desired in these circumstances.

The determination of this ratio can be accomplished using well known percolation theory and experiments. See, e.g., Zallen, R., *The Physics of Amorphous Solids*, John Wiley & Sons, New York, N.Y. (1983); Sahimi, M., *Applications of Percolation Theory*, Taylor & Francis, Bristol, Pa. (1994); and, Stauffer, D., and Aharony, A., *Introduction to Percolation Theory*, second edition, Taylor & Francis, Bristol, Pa. (1991), all of which are incorporated herein by reference.

Also, the following calculation may be used to calculate the average conductive island size $\xi$:

$$\xi = \xi_0 \left[ \frac{(p_c - p)}{(1 - p_c)} \right]^{-\nu}$$

where $\xi$ is the correlation length, $\xi_0$ is the correlation length scale factor, $p_c$ is the percolation threshold, $p$ is the volume fraction of conductive particles and $\nu$ is the correlation length critical exponent. This is described in more detail in Heaney, M. B., "Measurement and Interpretation of Non-universal Critical Exponents in Disordered Conductor-insulator Composites," Physical Review B, v. 52, n°. 17, pages 12477-12480 (1995), which is incorporated herein by reference. For conducting and insulating spheres in a randomly closed pack distribution, $p_c$=0.45 (in two dimensions) and $p_c$=0.16 (in three dimensions).

Figure 4:
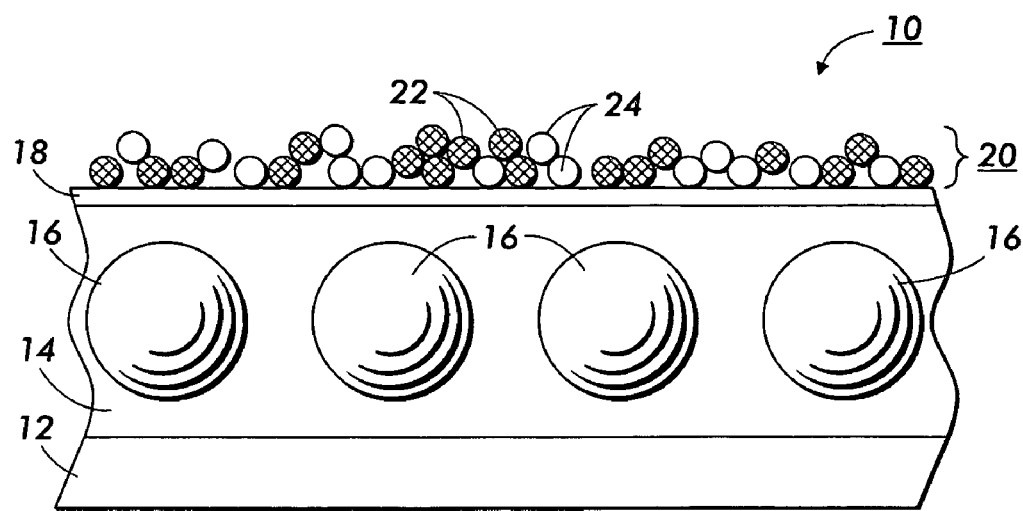
FIG. 4 is a cross-sectional view of a portion of an electric paper structure according to the presently described embodiments.

Referring now to FIG. 4, an electric paper apparatus 10 is illustrated. The apparatus 10 includes a ground plane, or encapsulating layer, 12 and a media plane 14. The media plane 14 has embedded therein display elements 16. Electric paper structure 10 further includes an image plane, or encapsulating layer, 18 having a charge retention layer 20 disposed thereon. The charge retention layer 20 includes conductive particles 22 (not all numbered but colored dark) and non-conductive particles 24 (not all numbered but colored light) disposed on the image plane 18 in a disordered mixture as described above.

It should be understood that the ground plane 12 is shown as a simple grounding structure. However, ground plane 12 could take a variety of forms. For example, the ground plane could include multiple layers including insulating layers and conducting layers. An example of such a configuration is shown in FIG. 1 wherein a ground plane is formed of an encapsulating layer 204 and a ground plane 206. Ground plane 12 may also take the form of a flexible or elastomeric ground plane as described in commonly assigned, U.S. patent application (now U.S. Pat. No. 7,357,978, issued Apr. 15, 2008) having Ser. No. 11/739,614, filed Dec. 18, 2003, entitled "Flexible Electric Paper Display Apparatus," and naming Schmitz, Heaney and Shrader as inventors, which is incorporated herein by reference. In that application, the conductive ground plane is described, in one form, as being comprised of a flexible insulating layer adjacent a flexible conducting layer. In another embodiment described therein, the ground plane is described as comprising a layer of conductive particles or fibers disposed between two elastomeric insulating sheets. Ground plane 12 may also be a discontinuous ground plane, as described in co-pending, commonly assigned U.S. patent application having Ser. No. 10/739,839, filed Dec. 18, 2003, entitled "Improved Flexible And Transparent Ground Plane For Electric Paper," and naming Schmitz and Heaney as inventors, which is incorporated herein by reference. Ground planes such as these would provide the present embodiment with improved flexibility.

The media plane 14 may also take a variety of different forms. In one embodiment, the media plane 14 has display elements embedded within an elastomeric material. Other materials or structures may be used. For example, embedding the display elements is not necessary. The display elements may be formed in the layer using other techniques such as photolithography, etching . . . etc. The display elements 16 likewise may take a variety of forms but, in one embodiment, display elements 16 are microencapsulated bichromal spheres, which are known in the field. Any electric rotating sphere, electrophoretic particles, liquid crystal droplets, etc. may be used to form a display or media plane. The display elements may also each comprise a plurality of display particles housed within a single microencapsulated structure. Any of these forms may be used in connection with the presently disclosed embodiments of electric paper provided that the display elements are reactive to electric charge to facilitate electric printing as described above.

Image plane 18 is preferably formed of a clear, flexible plastic material. One example is Mylar material.

As noted above, the conductive particles may take the form of 10 micrometer silver-coated glass spheres while the non-conductive particles may take the form of 10 micrometer glass spheres. Of course, variations of these forms may also be used. For example, the size of the particles may vary from the example of 10 micrometers described herein. Moreover, the shape of the particles may vary, provided that the selected shape is conducive to conductivity and the random formation of charge retaining islands. As is known, the charge retention layer is useful to hold electric charge near the display elements of the media plane.

Figure 5:
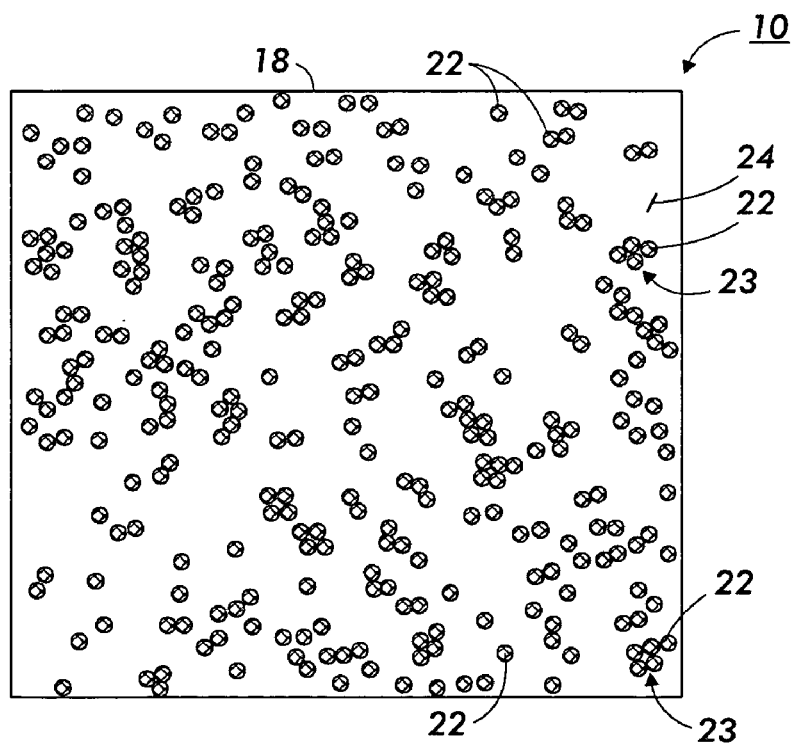
FIG. 5 is an illustration representing a top view of the embodiment shown in FIG. 4; and, FIG. 6 is a cross-sectional view of another embodiment of electric paper.

Referring now to FIG. 5, a top view of the embodiment shown in FIG. 4 is illustrated. As shown, the charged conductive particles 22 forming islands 23 are randomly dispersed throughout the image plane 18 of the electric paper structure 10. Also shown throughout the random dispersion of conductive islands are the non-conductive particles 24, only shown as white background for ease of explanation. Of course, as noted above, the distribution of conductive islands throughout the charge retention layer allows the charge retention layer to selectively hold electric charge near display elements which reside in the media plane layer of the electric paper structure.

To form the charge retention layer 20 as illustrated in FIG. 4, a ratio of conductive particles to non-conductive particles that is below a percolation threshold must first be determined. The process for doing so is described above and may vary from application to application—depending on total number of particles used, the volume of these particles, the thickness of the layer, and area over which the particles are spread. Once the appropriate value is determined, conductive and non-conductive particles are mixed to obtain a disordered mixture of the particles in accordance with the determined value. These particles are then applied to the image plane (e.g., plastic sheet) that has a thin coating of adhesive thereon. The plastic sheet, or image plane 18, can be formed as a part of the electric paper structure or independent of the electric paper structure (and later positioned thereon). Once the adhesive is allowed to dry, the excess particles are simply removed from the plastic sheet. This may be accomplished using any of a number of techniques including compressed air.

In another embodiment of the electric paper structure 10, the disordered mixture of conductive and non-conductive particles is encapsulated in an elastomeric material to provide for stability and durability of the charge retention layer. Any suitable elastomer may be used to accomplish this task.

Figure 6:
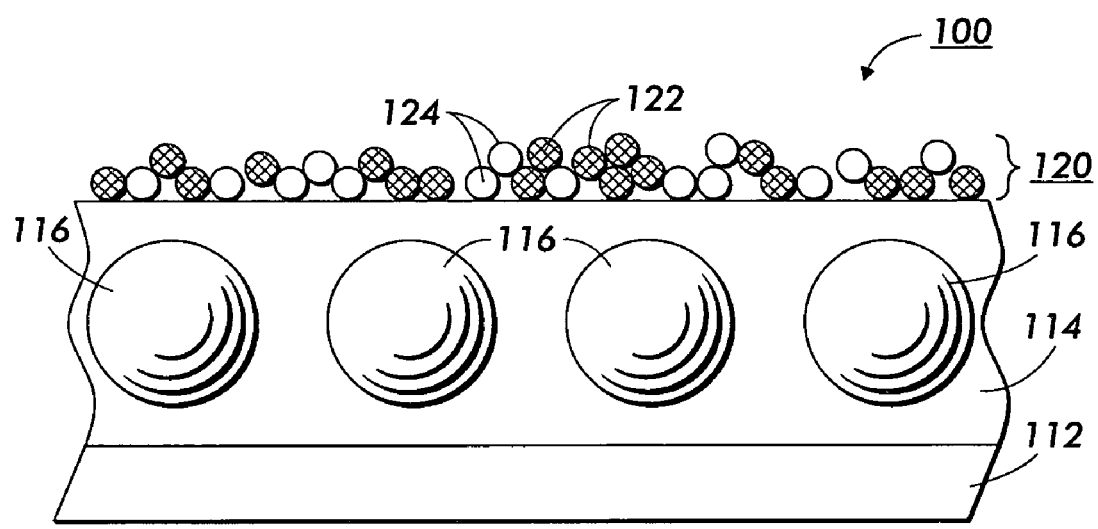

Referring now to FIG. 6, another embodiment of an electric paper structure 100 is illustrated. As shown, a ground plane 112 is provided adjacent to a media plane 114. Media plane 114 has embedded therein display elements 116. Also shown is a charge retention layer 120 including conductive particles 122 and non-conductive particles 124.

As with the embodiment of FIG. 4, the ground plane 112 and the media plane 114 (and the display elements 116) may take a variety of forms. The same variety may also be applied to this embodiment.

Notably, the charge retention layer 120 is shown as being directly applied to the media plane 114. This, of course, eliminates the image plane from the structure 100. An advantage of this configuration is that the voltage drop across the charge retention layer is very little when compared to the voltage drop across charge islands disposed on a plastic sheet. Therefore, lower printing voltages can be used in this scenario. Moreover, this embodiment of the electric paper structure will result in improved print resolution because it has less layers between the source of the electric field (e.g. the electric paper printhead) and the target of the electric field (e.g. the display element) than the embodiment described in connection with FIG. 4.

Like the embodiment shown in FIG. 4, the disordered mixture of conductive and non-conductive particles may also be encapsulated in an elastomeric material to form the charge retention layer.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An electric paper apparatus comprising:
a ground plane;
a media plane having a first side adjacent the ground plane, the media plane having embedded therein display elements that are reactive to electric fields;
an image plane having a first side adjacent a second side of the media plane, the image plane being formed of a plastic material; and,
a charge retention layer adjacent a second side of the image plane, the charge retention layer operative to selectively provide electric fields to the display elements of the media plane and including a disordered mixture of conductive particles and non-conductive particles, a ratio of the conductive particles to the non-conductive particles being below a two-dimensional percolation threshold to form conductive islands, whereby a continuous conductive path through the charge retention layer is avoided.

2. The apparatus as set forth in claim 1 wherein the display elements comprise microencapsulated bichromal spheres.

3. The apparatus as set forth in claim 1 wherein the plastic material is clear, flexible plastic material.

4. The apparatus as set forth in claim 1 wherein the ground plane, the media plane, the image plane and the charge retention layer are selectively adhered to adjacent layers.

5. The apparatus as set forth in claim 1 wherein the disordered mixture is encapsulated in an elastomeric material.

6. An electric paper apparatus comprising:
a ground plane;
a media plane having a first side adjacent the ground plane, the media plane having embedded therein display elements that are reactive to electric fields; and,
a charge retention layer adjacent a second side of the media plane, the charge retention layer operative to selectively hold electric charge near the display elements of the media plane and including a disordered mixture of conductive particles and non-conductive particles, a ratio of the conductive particles to the non-conductive particles being below a percolation threshold to form conductive islands, whereby a continuous conductive path through the charge retention layer is avoided.

7. The apparatus as set forth in claim 6 wherein the display elements comprise microencapsulated bichromal spheres.

8. The apparatus as set forth in claim 6 wherein the ground plane, media plane and the charge retention layer are selectively adhered to adjacent layers.

9. The apparatus as set forth in claim 6 wherein the disordered mixture is encapsulated in an elastomeric material.

10. An electric paper apparatus comprising:
a media plane, the media plane having embedded therein display elements that are reactive to electric charge; and,
a charge retention layer operative to selectively hold electric charge near the display elements of the media plane, the charge retention layer including a disordered mixture of conductive particles and non-conductive particles, a ratio of the conductive particles to the non-conductive particles being below a percolation threshold to form conductive islands, whereby a continuous conductive path through the charge retention layer is avoided.

11. The apparatus as set forth in claim 10 further comprising a ground plane.

12. The apparatus as set forth in claim 10 further comprising an image plane being formed of a plastic material.

13. The apparatus as set forth in claim 12 wherein the plastic material is clear, flexible plastic material.

14. The apparatus as set forth in claim 10 wherein the display elements comprise microencapsulated bichromal spheres.

15. The apparatus as set forth in claim 10 wherein the media plane and the charge retention layer are selectively adhered to one another.

16. The apparatus as set forth in claim 10 wherein the disordered mixture is encapsulated in an elastomeric material.

17. A method for forming a charge retention layer of an electric paper apparatus having a media plane, the media plane having embedded therein display elements that are reactive to electric fields, the method comprising:

determining a ratio of conductive particles to non-conductive particles that is below a percolation threshold;

mixing conductive particles and non-conductive particles in accordance with the ratio to obtain a disordered mixture of particles; and, applying the disordered mixture of particles to the media plane to selectively hold electric charge near the display elements of the media plane with charge retaining conductive islands, whereby a continuous conductive path is avoided.

18. The method as set forth in claim 17 wherein the disordered mixture is applied to an image plane formed of plastic material.

19. The method as set forth in claim 18 wherein the plastic material is clear, flexible plastic material.

20. The method as set forth in claim 17 wherein the disordered mixture is applied to the media plane.

\* \* \* \* \*